Jan. 23, 1968   L. B. TOROBIN   3,364,690
PROCESS FOR CRYSTALLIZATION
Filed May 13, 1965
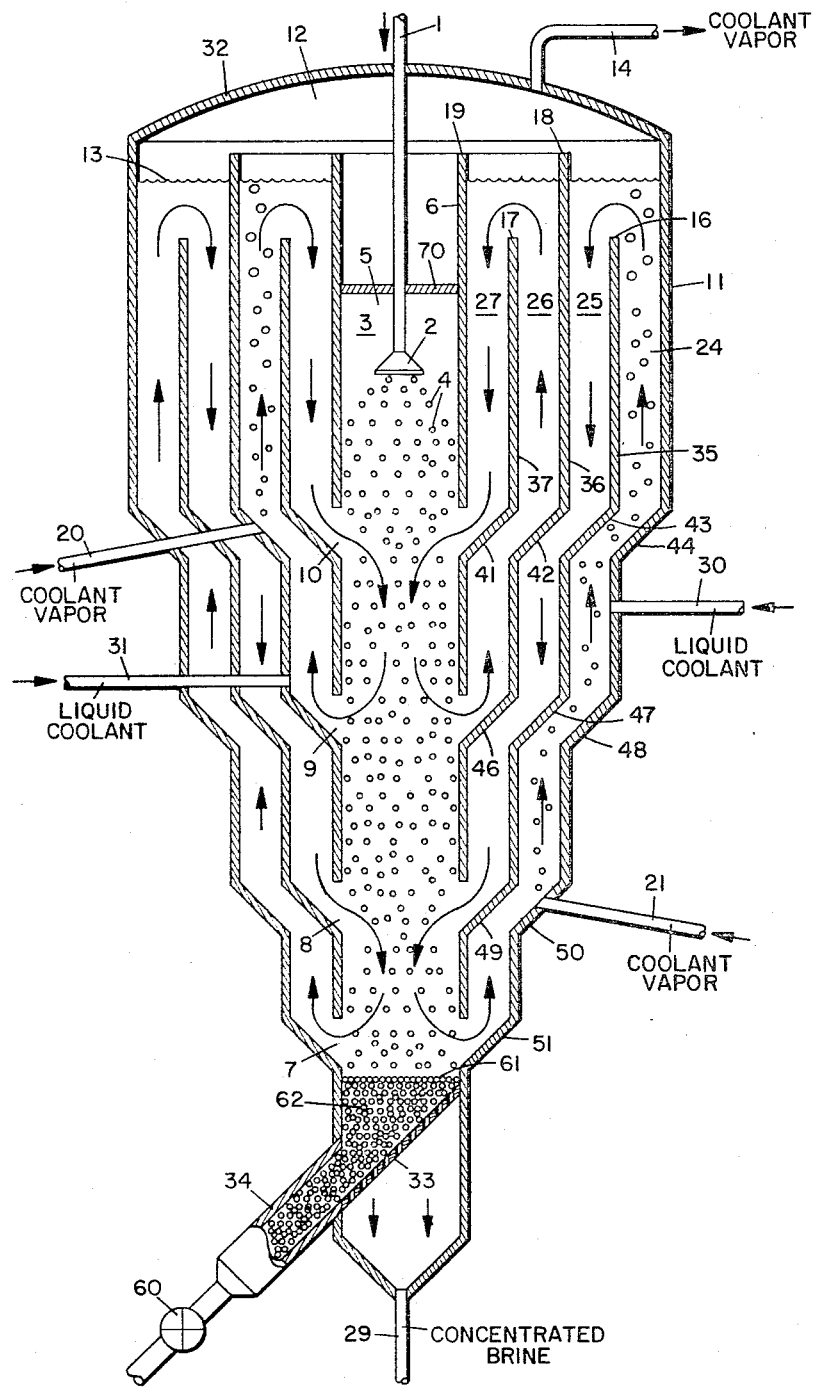
LEONARD B. TOROBIN INVENTOR
BY Perry Carvellas
PATENT ATTORNEY

United States Patent Office 3,364,690
Patented Jan. 23, 1968

3,364,690
PROCESS FOR CRYSTALLIZATION
Leonard B. Torobin, Newark, N.J., assignor to Esso Research and Engineering Company, a corporation of Delaware
Filed May 13, 1965, Ser. No. 455,555
13 Claims. (Cl. 62—58)

ABSTRACT OF THE DISCLOSURE

This disclosure relates to a process and apparatus for recovering solvent from solution by freezing. The solution is contacted with an immiscible coolant under conditions such that crystallization occurs over a relatively narrow temperature range. The coolant is fed to the crystallization chamber through a plurality of outlets which are positioned adjacent to the corresponding inlets. The flow of coolant to and from the crystallization chamber is due to convection.

This invention relates to a process for removing solvent from a solution, which process comprises cooling the solution to a temperature at which the solvent forms crystals, crystallizing at least a portion of the solvent and separating the crystals from the solution. Further, this invention relates to a novel process and apparatus for providing refrigeration to a crystallization tower. In accordance with this invention, feed is sprayed as a dispersed phase into the tower containing a continuous phase immiscible coolant, and solvent crystallizes from the dispersed phase droplets as crystals over a relatively narrow chilling temperature range. The dispersed phase feed and the immiscible coolant are contacted countercurrently in the tower by introducing the feed into one end of the tower in the form of essentially uniform diameter droplets and introducing the immiscible coolant phase into the tower at several points along the height of the tower, whereby the coolant moves in the tower countercurrently relative to the feed droplets.

More specifically the present invention relates to an apparatus and process whereby a normally gaseous refrigerant is contacted in the liquid phase with a dispersed phase of essentially uniform size feed droplets, in which droplets crystals are formed. The immiscible liquid coolant ascends and is warmed by removing the latent heat of crystallization from the feed. A portion of the coolant is flashed at the top of the tower cooling the remaining liquid coolant.

The apparatus used in accordance with this invention comprises a central chilling chamber and outwardly-spaced paired concentric chambers surrounding the central chilling chamber. When the feed is more dense than the coolant, the feed descends in the central chamber. The coolant is circulated upwardly and downwardly in paired concentric chambers and through the central chamber. The cold coolant is conveyed downwardly through one of the outwardly-spaced paired concentric chambers surrounding the central chilling chamber due to the difference in density of the cool continuous coolant and the warm continuous coolant. The coolant in the central chamber moves relatively countercurrently to the descending, dispersed feed phase. Also, the warm coolant moves outwardly into the other of the paired concentric chambers containing upwardly moving continuous phase coolant due to the average higher density of the continuous phase coolant plus dispersed feed phase in the central chamber. The return flow of cold coolant is accommodated by a means of the first of the paired annular or concentric chambers. A portion of the liquid coolant is vaporized in the top of the tower, withdrawn, compressed, cooled, condensed and returned to the tower primarily through the upflow concentric chambers.

In order to simplify the discussion of the invention, an aqueous solution will be used to exemplify a feed solution, water being the solvent.

Various methods have been used in an attempt to find a practical way of crystallizing water from aqueous solutions. It has been found that crystal growth is improved as the temperature difference between the coolant and the feed is reduced. The overall cost of carrying out the process is substantially reduced as the temperature difference between the coolant and the feed is minimized. For a given rate of heat transfer, the temperature approach can, of course, be reduced by increasing the area for heat transfer. Therefore, a technique whereby a large interfacial area for heat transfer is provided results in a major advantage in carrying out the process. Another problem encountered in separating materials by crystallization is that the crystallized materials, in many instances, have been very difficult to separate either in centrifuges or by filtration due to the relatively small crystals resulting from wide particle size distribution. The small size of the crystals in centrifuges would have slow settling rates or velocities, particularly where the mother liquor has a very close density to the crystals. Also where filters are used, small crystals tend to blind the filters.

A known technique for crystallizing water from saline solutions has been to mix the saline solution directly with liquid butane and flashing butane from the mixture. In this technique the aqueous solution being treated was sprayed directly into the flashing butane through a vapor gap. This process can cause shock chilling, that is, rapid formation of the ice crystals, which rapid formation can cause occlusion of dissolved salts in the crystals formed. Also, the crystals during their formation can experience severe turbulence in the vicinity of the flashing butane, which breaks up the crystals, preventing the formation of large crystals. Also, the local expansion of the refrigerant and/or any refrigerant trapped in formed crystals disintegrates the crystals.

A more recently developed direct chilling technique has been to utilize a layer of liquid butane over an immiscible liquid layer of an aqueous salt solution from which water is to be crystallized. The pressure above the liquid layer of butane is gradually reduced so that the butane flashes, thereby cooling the liquid butane that remains. The cold butane layer cools the aqueous solution beneath it, thereby crystallizing water from the solution at the butane water interface. The ice crystals collect in a layer at this interface. A major difficulty encountered in this technique is the inefficient heat transfer between the liquid butane layer and the aqueous salt solution liquid layer which requires vigorous mixing of the solution which results in disturbing the ice crystals during their formation. This technique is inefficient due to the relatively small interfacial area available for heat exchange between the aqueous solution being treated and the cold butane layer and because of the practical difficulty of removing the ice crystals once they are formed.

More recently a dense dispersion technique utilizing an immiscible coolant has been applied to a system where a multicomponent feed is cooled by direct countercurrent contact with an immiscible coolant. In such a system the cooling and crystal growth occurs within dispersed phase droplets over a wide temperature range. For example, in crystallizing wax from a lube oil fraction, the oil droplets will be cooled from a feed inlet temperature of about 120° F. to the final dewaxing temperature of about −30° F. The coolant will be introduced into the chilling apparatus at a temperature of about −40° F. and after countercurrently contacting the feed, will leave the cooling apparatus at a temperature of about +110° F. As the coolant is warmed and the feed cooled due to the countercurrent contact in the tower, the wax crystallizes from the solution over the entire chilling temperature range of +120 to −30° F. Utilizing this technique, a relatively cold coolant can be used at an inlet temperature substantially below the inlet temperature of the feed in the countercurrent contact heat exchange tower to remove the latent heat of crystallization of the wax. Because the different wax components of the lube fraction crystallize from the solution at different temperatures, this technique is efficient in removing the wax.

This technique recently has been applied to removing water as ice from aqueous solutions, e.g. sea water. The sea water, however, is essentially a two component system, and it is the water, i.e. solvent, that is crystallized from the solution. The freezing temperature of water varies only slightly with the salt concentration; for example, a salt concentration of 4% sodium chloride freezes at about 29° F., whereas a salt concentration of 50% sodium chloride freezes at a temperature of about 26° F. Therefore, generally only a relatively narrow chilling range is available for crystallizing the water from the solution. Under these conditions to crystallize substantial amounts of water, for example, 50 volume percent at chilling temperatures whereby shock chilling is avoided, large volumes of coolant have to be circulated to provide sufficient refrigeration capacity to remove the latent heat of crystallization of the water. This technique of direct contact of the dispersed phase salt water solution with the continuous phase immiscible coolant is effective in growing large, easy-to-separate crystals.

In accordance with the present invention, an aqueous solution containing crystallizable water is fed to a central chilling chamber of a tower, which chilling chamber is surrounded by concentric outwardly-spaced annular chambers for convection coolant circulation. The aqueous feed is fed into the crystallization chamber at a temperature above the freezing point of the water which enters the chilling chamber in the form of a relatively dense dispersion of essentially uniform size droplets. The continuous phase liquid immiscible coolant is fed into the chilling chamber at spaced intervals along the height of the crystallization chamber and moves counter-currently relative to the descending dense dispersion of water droplets. Because of the uniformity of the size of the droplets making up the dense bed of spheres, the droplets move together at a controlled rate as a moving bed in the column. Also because of the essentially uniform size of the droplets, the droplets are chilled at a controlled, even rate. The coolant is fed to the central crystallization chamber through inlet ports along the height of the central chamber of the column at a temperature below the freezing point of the aqueous solution; and by feeding it at several spaced intervals along the height of the central chamber, sufficient refrigeration capacity is added to the column throughout the height of the column to effectively remove the latent heat of crystallization of the descending water droplets as the ice crystals form along the entire height of the crystallization chamber. By the time the dense bed of droplets reaches the opposite end of the column, part or substantially all of the pure crystallizable water in the droplets, depending on the feed rate and the coolant inlet rate, can be crystallized out of the solution as ice. During descent the droplets pass ports which alternately introduce and discharge the coolant thereby subjecting them to a mild temperature cycle. At the opposite end of the tower from which the feed was introduced, the ice crystals and mother liquor form a slurry. This ice crystal and mother liquor slurry is withdrawn from the tower and can be either filtered or centrifuged to separate the ice crystals from the mother liquor. The warm coolant collects in the top of the tower in a central common flash chamber, and the pressure in the top of the tower is controlled at a value such that a sufficient portion of the coolant flashes to cool the remaining liquid coolant to the coolant inlet temperature. The cooled coolant flows by convection downwardly through the concentric annular convection chambers and is introduced at spaced intervals along the height of the central crystallization chamber. Alternately, the coolant can be removed from the top of the tower as a liquid, part of it flashed externally to the column and the remaining cooled liquid coolant returned to the column. This dense dispersion technique for crystallizing ice from solution provides an extremely efficient method of heat transfer between the coolant and the feed due to large interfacial areas of contact for heat transfer.

By controlling the diameter of the aqueous droplets and the volume holdup of the dispersed phase, the rate of descent of the droplets through the continuous immiscible phase can be controlled; and by controlling the rate of convection circulation of coolant through the paired concentric convection circulation chambers, the chilling rate of the ice crystals forming in the droplets in the tower can be controlled.

The novel aparatus of this invention utilizing a central crystallization chamber surrounded by concentric convection circulation chambers provides a large amount of refrigeration capacity to the crystallization column at spaced points in the column so that controlled gradual removal of the latent heat of crystallization of the ice crystals as they form is provided. By utilizing the internal convection circulation of liquid coolant in the paired convection chambers, the major portion of the refrigeration capacity required to absorb the latent heat of crystallization of the ice crystals can be provided by the internal circulation of the coolant, thereby obviating the need of expensive pumping equipment and piping to circulate the coolant externally.

The coolant can be maintained at the minimum or near the minimum crystallization temperature required in the crystallization step in the tower, e.g. 24 to 29° F., throughout the tower and still provide sufficient refrigeration capacity to remove the latent heat of crystallization needed to obtain efficient crystal growth.

The major portion of the cooling capacity is provided by the internal circulation of the coolant within the tower. The only coolant normally circulated externally to the tower is the vaporized coolant withdrawn from the top of the tower at about 24° F., which is then compressed, cooled by heat exchange, liquefied and returned to the tower. The compressed coolant can be heat exchanged directly or indirectly with the cold concentrated salt solution and/or the ice removed from the process. This reduces the temperature and liquefies the coolant that is to be recirculated and returned to the tower through an external upwardly-moving chamber.

A particular and important feature of the process is that the dispersed aqueous feed droplets are introduced into the central crystallization chamber of the column at a point below that which the coolant flashes in the tower, thereby avoiding the severe agitation and shook chilling that occurs when the feed is sprayed directly into flashing coolant.

The convection currents set up in the annular chamber and in the central crystallization chamber can be augmented by injecting gaseous coolant directly into the concentric convection coolant chambers containing upwardly-flowing coolant and also by introducing relatively warm recycle liquid coolant into these chambers.

An embodiment of the invention and the operation of the novel apparatus constructed in accordance therewith can be seen by referring to the drawing accompanying and forming part of this specification.

The figure of the drawing is a diagrammatic elevational view of a crystallization apparatus showing the center chamber as the crystallization chamber and a series of outwardly-spaced paired annular concentric chambers which are the convection chambers in which the coolant circulates. The drawing also shows a common coolant flash zone in the top of the tower and a crystal takeoff means in the bottom of the tower.

The aqueous feed solution which is to be treated in accordance with the apparatus and process of the present invention must remain liquid under the conditions of feeding to the apparatus. For example, the crystallizable water in the aqueous solution to be treated should be completely dissolved in the feed solution prior to spraying it into the crystallization apparatus, and even after crystallization the remaining solution should remain in a fluid, easy-to-handle state for ease in separating the crystallized material from the remaining solution. Further, in order to prevent the formation of an emulsion or entrainment of feed in the continuous coolant phase, there must be sufficient density difference between the coolant and the dispersed phase feed droplets so that they naturally separate by gravity. This difference should exist even after the crystallized water is separated from the mother liquor. Any solution that contains a solvent which can be crystallized to form crystals on cooling is a suitable feed to the process.

A typical feed to this process can be sea water, which contains as a principal contaminant about 3.5 weight percent sodium chloride and about 0.5 weight percent of minor amounts of other dissolved salts. Generally, an efficient operation for obtaining potable water from sea water would involve the removal of about 10 to 50% by volume of the sea water as relatively pure ice crystals. The crystals are separated from the concentrated salt water, washed and subsequently melted to obtain the fresh water product. More or less than about 50% of the water can be removed from the feed solution depending on the refrigeration capacity available and the amount of coprecipitation of impurities that can be tolerated. The sodium chloride concentration in the ice crystals which are recovered can be about 300 to 500 parts per million. This is considered to be potable water.

The coolants which are used in accordance with the present invention are normally gaseous liquefied immiscible autorefrigerants, which preferably have a flash temperature at or near the freezing point temperature of the aqueous solution being treated at reasonable pressures.

The coolants are also selected to have a different density than the feed solution so that they can pass relatively countercurrently by gravity flow at reasonable flow rates. Suitable coolants for crystallizing water from aqueous solutions are liquid butane, isobutene, mixtures of light hydrocarbons of $C_4$ to $C_5$ carbon lengths, halogenated hydrocarbons, the autorefrigerant Freon, etc. Coolants that are more dense than the feed solution, as well as those that are less dense, can be used. When coolants that are more dense than the feed are used, the feed is introduced into the bottom of the central chamber and the crystals and mother liquor withdrawn from the top of the chamber. The coolant in either case is withdrawn from the top of the chamber. The pressure in the crystallization tower is maintained at such a value as to keep the coolant in the liquid phase during the initial contacting and the crystallization step. After the coolant has absorbed the latent heat of crystallization from the feed, it ascends to the top of the tower. The pressure in the top of the tower is less than that in the bottom of the tower due to the hydrostatic pressure head.

Various diluents may be added to the coolant to improve the viscosity of the coolant so that it may be more easily handled and/or to aid in the crystallization and separation of the crystals from the feed. Also, antisolvents for the solvent in the feed solution can be added to the feed or coolant. The aqueous feed may also contain materials to aid in the contacting of the feed with the coolant, e.g. surfactants. Which can also be used to prevent droplets containing crystals from sticking to each other.

The aqueous feed solution is introduced into the central crystallization chamber of the tower through a modified spray head, which produces a dense dispersion of essentially uniform diameter droplets. The droplets have a narrow size distribution, and the diameter of the droplets can be, for example, $3/8$ to $1/24$ inch in diameter, preferably $1/4$ to $1/20$ inch in diameter, though droplets of $3/8$ to $1/32$ inch in diameter can be used. It is important that essentially uniform spherical-shaped droplets of narrow size distribution be obtained. If nonuniform diameter droplets are formed, the individual droplets will descend in the crystallization chamber at different rates, and controlled chilling of the feed cannot be easily obtained. Nonuniform size droplets will result in wide particle size distribution of the crystals formed, and the smallest crystals will either cause blinding of the filter medium or will not centrifuge at reasonable throughputs and gravitational fields. The aqueous feed solution is introduced into the central crystallization chamber of the tower at a feed rate of 15 to 325 cubic feet/square foot of central chamber column cross-sectional area/hour, though rates of 35 to 150 cubic feet/square foot of column cross-sectional area/hour are preferred. However, rates of 25 to 250 cubic feet/square foot of column cross-sectional/hour can also be used. The rate at which the aqueous solution is fed to the crystallization tower will depend on the feed temperature, the crystallization temperature, the height of the column and the cooling capacity available to crystallize the water from the solution. The rate at fhich the aqueous solution is fed to the crystallization chamber of the tower and the rate at which the coolant is circulated in the tower and countercurrently contacted with the dispersed phase feed will balance so as to provide the necessary rate of heat transfer and absorption of the latent heat of crystallization from the feed solution to obtain proper chilling and crystallization of the feed droplets.

The internal circulation rate of the coolant relative to the rate of introduction of the feed will be several times higher than throughput rate of the feed depending on what percent of the water present in the feed is crystallized from the feed. The larger the amount of ice that is desired to be crystallized from the feed solution, the higher the circulation rate of the coolant that will be required. The volume holdup of the dispersed phase feed droplets directly affects the rate of descent of the dispersed phase feed droplets through the tower. Generally, the smaller the volume holdup, the shorter the residence time of the droplets in the tower but the smaller the throughput rate. Conversely, the higher the volume holdup, the slower the descent of the individual droplet through the column but because there are more droplets in the column, the larger the throughput of the feed through the column.

The height and diameter of the tower used will depend on a particular service the tower is to be put to, as well as the total volume throughput of feed and the amount of ice to be crystallized from the feed. The height of the tower can advantageously be, for example, between 5 and 120 feet, more generally 30 and 75 feet and preferably around 40 and 60 feet. The diameter of the tower, that is, referring to the diameter of the central crystallization chamber of the tower, can be $1/2$ to 10 feet. Towers of this height and diameter will have cross-sectional areas of the concentric chambers surrounding the central chamber of the tower to provide the internal convection flow of coolant of about four times the cross-sectional area of the central chamber.

The above dimensions are given as illustrative only and other configurations can be used as needed.

The relative internal circulation of coolant per volume of feed will vary considerably with the particular feed and coolant and the pressure and temperature at which the operation is carried out, but as an illustrative example the relative internal circulation of coolant to feed will be about 100 to 1 to 25 to 1, preferably 10 to 1 by volume. The relative external circulation of the coolant per volume of feed will vary with the particular coolant being used but will generally be about the same as the feed circulation rate.

By introducing the aqueous dispersed phase feed into a quiescent area of continuous liquid phase coolant and by introducing the feed as essentially uniform diameter droplets, maximum interfacial surface area for heat transfer between the dispersed phase droplets and the continuous phase coolant is obtained and results in maximum efficiency of heat transfer from the aqueous coolant droplets to the coolant. Because of this efficient technique of heat transfer, the temperature difference between the two phases in any point of a column is minimized and growth of large pure crystals is enhanced.

The difference in density between the immiscible continuous phase coolant and the dispersed phase feed is sufficient to separate the two liquids by gravitational force under the conditions at which the process is carried out. The rate of descent of the feed droplets in the crystallization chamber of the tower is a function of the volume holdup of the dense dispersion, which is a function of the feed rate. The droplet diameter and the viscosity of the coolant affects the rate of descent but the volume holdup is the principal feature affecting the descent in the column. Cooling rates of 0.1 to 15° F. per minute and 0.25 to 5° F. per minute can be used, but due to the small chilling range, the cooling rate is not particularly critical. What is important is the rate at which the latent heat of crystallization is removed from the crystal growth site and providing sufficient refrigeration capacity to crystallize the desired amount of water from a particular aqueous feed droplet.

The input temperature of the coolant at the spaced input positions along the height of the crystallization chamber and the volume of coolant circulated internally are maintained at a sufficient rate to chill the droplets to the separation temperature and to crystallize or precipitate the desired amount of crystallizable water from the aqueous feed. Since the crystallization of water in going from about a 3½% concentration to about a 7% concentration of dissolved salts only covers a temperature range of only 3 to 4° F., large volumes of coolant must be provided at temperatures not too much below this minimum crystallization temperature to absorb the latent heat of crystallization in the feed droplets. The inlet temperature of the coolant along the tower height can be 1 to 30° F., preferably 2 to 10° F., below the minimum crystallization temperature of the dispersed phase feed droplets in the tower.

It is desirable to introduce the aqueous dispersed phase feed into the central crystallization chamber of the tower at a temperature only slightly above the temperature at which ice crystals start to form in the feed droplets. This allows utilizing the particular apparatus of this invention principally to remove the latent heat of crystallization of the feed rather than to precool the feed. Aqueous solutions to be treated in accordance with the present invention can first be contacted in direct contact immiscible chilling towers which function solely to reduce the feed from about ambient temperatures, e.g. 70° F. to about 32° F., in a simple heat exchange tower of the type described in applicant's copending application Ser. No. 135,092.

The crystallization temperature of any specific aqueous feed solution will depend upon the amount of dissolved solids in the feed. Generally, the more solids dissolved, the lower the crystallization temperature. Suitable inlet feed temperatures for aqueous solutions containing about 4% dissolved salts will be between about 32 and 28° F., more generally between about 29 and 30° F. The inlet temperature of the coolant will be determined by the desired chilling rate, as well as the amount of temperature difference between the feed and the coolant which can be tolerated without obtaining shock chilling. In the case of water this temperature difference will be as stated before—between about 1 and 30° F. below the crystallization temperature of the feed. Suitable inlet temperatures for the coolant will be between about 28 and −10° F. depending on the height of the tower and the pressure difference between the bottom of the tower and the top of the tower. In the bottom of the tower at maximum hydrostatic pressure, the dispersed phase feed is subjected to its final crystallization temperature; in the top of the tower, i.e. the portion of the liquid coolant phase, at lower pressure, the warmed coolant is flashed to cool the coolant and to provide the internal circulation of the coolant in the tower. The flashing is carried out at a point away from the point feed is introduced. Therefore, the difference in pressure between the bottom and top of the tower will be determined by the height of the liquid phase in the tower, the volume holdup of dispersed phase feed, the density of the continuous phase immiscible coolant used and the vapor pressure in the top of the tower. The pressure in the tower will be maintained sufficiently high to keep the continuous phase immiscible coolant in the liquid phase throughout the crystallization area at the desired temperature. The pressure in the top of the tower will be controlled at a value designed to allow vaporization of a sufficient amount of the coolant to cool the remaining liquid coolant and to provide the desired internal circulation and refrigeration capacity required to carry out the crystallization step.

Ice crystals of the size of 25 to 1000 microns, depending on the feed and the conditions of crystallization, can be grown. However, ice crystals of 50 to 400 microns are more common. The uniform crystal growth under the controlled conditions of the inventive apparatus and process herein described facilitates the separation of substantially pure ice crystals from the concentrated solution that remains.

The novel apparatus of the present invention may be better described with reference to the figure of the drawing. Referring to the drawing, the construction of the novel contacting tower of the present invention can be readily ascertained. The central crystallization chamber of the tower is made up of an elongated vertically disposed cylindrical vessel 6 and in this embodiment vessel 6 has four openings extending around vessel 6, indicated by 7, 8, 9 and 10. Vessel 6 forms the central chamber 3, which is the crystallization chamber in which the continuous phase liquid coolant is countercurrently contacted with the dispersed phase feed droplets. The aqueous feed to be treated is introduced through line 1 and spray head 2 as essentially uniform diameter droplets 4 of narrow size distribution. The droplets form a relatively dense bed which moves downwardly in the tower. In the drawing it can be seen that in certain portions of the tower the coolant also moves downwardly. The contacting is still relatively countercurrent, however, since the dense bed of droplets moves downwardly faster than the coolant. Therefore, relative to the movement of the coolant, the contacting of the droplets and the coolant is countercurrent. The continuous phase coolant which countercurrently contacts these droplets is indicated by 5 in the drawing. Outwardly-spaced paired concentric annular convection chambers surround the central crystallization chamber. The first convection chamber used for the central chamber is chamber 27. Chamber 27 is formed by concentric cylinder or pipe 37, which forms a chamber of uniform thickness surrounding vessel 6. The concentric annular chamber communicates with the central chamber through circular opening 10. The bottom edge of the wall of cylinder 37 is connected to the wall of vessel 6 by connecting member 41 at opening 10, whereby chamber 27 communicates with chamber 3. The second concentric convection chamber for coolant is formed by concentric cylinder 36. Concentric cylinder 36 together with cylinder 37 forms chamber 26, which parallels the walls of cylinder 37 and vessel 6 conforming to the shapes of 37 and 6 and communicating with central chamber 3 through opening 9. The wall of cylinder 36 is connected to the wall of cylinder 37 by connected member or flange 42 and to wall 6 by connected member 46. Chambers 24 and 25 are formed in a similar manner by concentric cylinders 35 and 11. The cylinders are attached to each other by conventional supporting members not shown.

In this embodiment warm coolant flows out of central chamber 3 through annular opening 7 upwardly into common flash chamber 12. The upward flow of warm coolant is assisted by the injection of either relatively warm vapor coolant or relatively warm liquid coolant introduced through lines 21 and 30 into concentric convection chamber 24. At the top of the vessel, a portion of the warm coolant flashes cooling the remaining liquid coolant which liquid cooled coolant, being more dense than the warm coolant, flows downwardly through paired concentric chamber 25. The cold coolant enters the central crystallization chamber 3 through opening 8. The downward flow of cold coolant replaces the warm coolant which moves upwardly through annular opening 7.

The average density of the continuous phase coolant containing dispersed aqueous droplets is higher than the density of the coolant alone. This difference in density displaces the coolant out of the central chamber through opening 7 into chamber 24 and completes the convection loop. Cold coolant to replace this withdrawn warm coolant is provided from paired chamber 25 through opening 8. In this manner a continuous convection flow is maintained. The warm coolant goes to the top of the tower, is flashed and cooled and cold coolant returns through paired chamber 25.

Paired chambers 26 and 27 function in a similar manner.

Ice crystals and a portion of the concentrated solution are withdrawn through outlet means 34 through valve 60, while the remaining portion of the solution is withdrawn through line 29. Screening means 33 divert the crystals 62 to outlet means 34, while allowing some concentrated solution to pass through. The concentrated solution and ice crystals are withdrawn at a sufficient rate to maintain the concentrated crystal layer-coolant interface at about 61. The crystals 62 are formed by crystallizing ice from droplets 4.

The construction of the top of the tower is important in affecting the proper internal circulation.

Vessel 6 continues up to top 19 which is at about the same height as the topmost extension of the wall of cylinder 36, namely 18. The tops of the walls of cylinders 37 and 35, i.e. 17 and 16, respectively, are the same but substantially below tops 18 and 19.

Tops 18 and 19 extend above coolant liquid level 13. Spray head 2 extends substantially below liquid level 13 and under baffle 70. Also tops 16 and 17 are below liquid level 13.

As the coolant flashes the remaining liquid coolant is cooled. The warm coolant flows upwardly in chambers 24 and 26, is cooled, passes over weirs or tops 16 and 17 and flows downwardly in chambers 25 and 27, respectively.

The tower can be made by joining together concentric pipes of proper diameter and length, by conventional supports and by connecting them to each other with suitable flange members as shown.

The ice crystals 62 collect on screen 33, which has openings smaller than the smallest crystals formed and which is disposed at an angle in the bottom of the tower to divert the flow of the ice crystals out of the tower while allowing substantially all of the concentrated, uncrystallized solution from droplets 4 to flow through the screen downwardly to be withdrawn through line 29.

In order to simplify the explanation of the drawing and the illustration of the drawing, conventional pumps, supporting means, valves, pressure reduction valves, control valves, compressors and auxiliary apparatus, as well as heat exchange apparatus, have been omitted from the drawings. Appropriate separation means are used for separating the crystallized material from occluded mother liquor removed through outlet means 34, for example, a filter, centrifuge and suitable screw pump extrusion devices.

The spray head used for introducing the feed of essentially uniform diameter droplets of narrow size distribution is an important portion of the apparatus, though it does not form an inventive feature of this apparatus, in that it allows greater throughput of uniform diameter droplets without upsetting the column. The spray head produces the uniform diameter droplets which descend in the tower as a moving bed, each droplet descending at about the same velocity as the next droplet, providing a column of droplets of about uniform volume holdup throughout most of the tower and providing the same cooling history for each sprayed droplet forming uniform crystal growth.

The invention, however, is not to be limited to this manner of forming the uniform diameter droplets, since any means by which uniform diameter droplets are formed can be used in accordance with the present invention, and the present invention is intended to encompass these means.

At the top of the tower the concentric or annular chambers open into a common flash zone for the coolant 12. The pressure drop for a given height of tower is sufficient to maintain the coolant in the tower in the liquid phase throughout the contact area of chamber 3 while allowing a sufficient portion of slightly warm coolant in the top of the tower to flash into vapor space 12 cooling the remaining liquid coolant. The temperature to which the coolant is flashed depends on the pressure. Due to the increase in density of the cooled coolant and the convection currents established in the tower, the cooled coolant flows downwardly through the respective annular chambers and is readmitted into the central chamber at points where the annular chambers are in communication with the central chamber. Because the feed disperses droplets and the coolant in the central chamber for a given height of tower have an average density greater than the density of the continuous phase coolant in the concentric chambers, the warm coolant can be made to flow up some of the paired concentric chambers and cold coolant can be made to flow downwardly to take the place of the coolant flowing upwardly, thereby setting up convection currents to provide a large amount of cooling capacity internally in the tower.

In order to operate the tower in the manner illustrated in the drawing, the following startup procedure can be utilized. Liquid butane will be used as the illustrative continuous phase liquid coolant. The tower is filled with liquefied butane. The tower can have an effective height of about 75 feet; the central chamber can have a diameter of about 15 inches; and the total diameter of the tower, exclusive of insulation material, can be about 6 feet. This provides a tower with a cross-sectional area of the central chamber of about ¼ cross-sectional area of the four concentric convection chambers, each one of the concentric chambers having about the same cross-sectional area as the central chamber. The top of the tower can be at about 15 p.s.i.a. and the bottom can be at about 29 p.s.i.a.

Warm vapor coolant is introduced through lines 20 and 21 to start an upward flow of coolant in chambers 24 and 26. Liquid coolant to take the place of the upwardly displaced coolant moves outwardly from the central chamber through openings 7 and 9 into chambers 24 and 26. Coolant to replace this coolant moves downwardly from the top of the tower through convection circulation chambers 26 and 25 and through openings 8 and 10, respectively, into central chamber 3. As this circulation is set up the pressure in the top of the tower is reduced to about 12.5 p.s.i.a. causing flashing of the butane and cooling of the remaining liquid butane. In this manner the cold coolant reduced in temperature by flashing in flash chamber 12 moves downwardly in convection chambers 27 and 25 and takes the place of the warm coolant moving upwardly through chambers 26 and 24. The concentric chambers are paired, and a convection flow is established in the paired chambers.

Once the internal convection flow is established in the tower and the coolant is reduced to the crystallization temperature, an aqueous salt solution containing about 3.5% sodium chloride at a temperature of about 32° F. is introduced through line 1 and spray head 2 into central crystallization chamber 3. Horizontal baffle 70 separates the continuous phase coolant 5 in chamber 3 from the vaporized coolant in chamber 12. The feed is introduced into chamber 3 as essentially uniform diameter droplets in the form of a dense dispersion having a volume holdup of about 0.35 cubic foot of droplets/cubic foot of column. Continuous phase butane coolant 5 moves relatively countercurrently to the feed in the tower. The chilling range between the feed inlet temperature of 32° F. to the final crystallization temperature of about 26° F. in the bottom of the tower is about 6° F. Cold concentric brine solution is withdrawn from the bottom of the tower through line 29 and can be used in an indirect heat exchanger to cool the incoming feed or by direct heat exchanger to cool and liquefy the coolant.

The ice crystals formed can be directly contacted with warm compressed coolant to cool the coolant down to about 32° F. and to liquefy the coolant and to melt the ice crystals to obtain potable water product. The melted ice, i.e. water, and coolant are separated by conventional means. There is a temperature difference from the bottom of the tower of about 24° F. to the top of the tower of about 32° F. providing an overall countercurrent heating of the liquefied coolant and cooling of the sprayed feed, as well as a temperature cycling effect. Latent heat of crystallization is removed along the entire length of the column through this temperature chilling range by the introduction of cold coolant through several spaced coolant means 8 and 10. The warm coolant is withdrawn from the column after having absorbed the latent heat of crystallization from the ice crystals primarily through spaced communication means 9 and 7, thereby a continuous internal convection circulation of coolant is provided along the entire height of the tower providing large amounts of refrigeration capacity to remove the latent heat of crystallization of the feed. The internal circulation rate of the refrigerant will depend upon the feed rate of the dispersed phase feed and the amount of ice that is to be removed from the sprayed droplets.

The construction of the top of the column is important in affecting the proper internal convection circulation. The top of the column encasing the common flash zone consists of roof 32, which has sufficient strength to maintain the desired pressure of the coolant and to maintain most of the coolant in the liquid phase. The major portion of the externally cycled liquefied coolant is reintroduced into the tower through lines 30 and 31 and flows upwardly in the tower with the warm coolant and is flashed in the top of the tower to provide the necessary refrigeration. Vapor coolant can be introduced through lines 21 and 20 to aid the circulation.

By operating the tower in this manner, up to 90% of the circulation of the continuous phase coolant is provided internally by liquid convection flow. This eliminates the need for substantial pumping capacity and service requirements to operate and maintain the pumps, as well as initial investment in the pumps for circulation of the coolant. About 10% or more of the coolant is circulated externally as a vapor through line 14, cooled, compressed, suitably heat exchanged to recover refrigeration from the various process streams and circulated back into the tower as a liquid through lines 30 and 31.

*Example*

The invention is further exemplified by the following example. A tower with an effective height of 75 feet and a central chamber diameter of 15 inches is used. The external chambers have a cross-sectional area about four times that of the central chamber. In this example, a sea water solution containing 3.5 weight percent of sodium chloride as the principal contaminant is chilled by indirect contact with cold, pure water product and cold, concentrated brine solution from a temperature of about 70° F. to about 35° F. by conventional means. The product water leaves at a temperature of about 65.7° F. and the concentrated brine at about 64° F. About 45.3 volume percent of the water is removed from the feed solution as ice resulting in a concentrated brine solution containing about 7.0 weight percent sodium chloride. The ice crystals are removed and are washed with liquefied butane and product water. The ice crystals are contacted with compressed butane to cool and liquefy the butane and melt the ice crystals. The mixture separates into two layers, a liquid butane layer and a liquid water layer, which water layer is removed. Product water containing 300 to 500 p.p.m. sodium chloride is recovered.

The below table shows the amounts and temperatures of the various process streams.

Line 1:
 $7.68 \times 10^6$ lbs./hr. of 35° F. water containing 3.5% sodium chloride.

Line 14:
 $4.045 \times 10^6$ lbs./hr. gaseous butane at 24° F. and 12.5 p.s.i.a.

Line 29:
 $4.205 \times 10^6$ lbs./hr. of 7.5% concentrated sodium chloride at 26° F.

Line 30:
 $3.358 \times 10^6$ lbs./hr. liquid butane at 32° F. at 15 p.s.i.a.

Line 31:
 $.687 \times 10^6$ lbs./hr. of liquid butane at 65° F. and 37.5 p.s.i.a.

Line 60:
 $3.753 \times 10^6$ lbs./hr. of the ice crystals at 26° F.

The internal circulation of liquid butane in paired chambers 26 and 27 and 24 and 25 is estimated to be 8 to 10 times the external circulation of gaseous butane. Cold brine and cold product are used to cool the feed to the feed inlet temperature. Compressed butane gas is condensed by contact with the product ice crystals.

The temperature in the top of the tower, i.e. between openings 9 and 10, is about 29° F., whereas the temperature between outlets 7 and 8 is about 26° F. This provides a chilling range of from 35 to 26° F., about 9° F. The ice crystals 62 are recovered and melted to obtain water with 300 to 500 p.p.m. sodium chloride.

In the above Example it can be readily seen that a large amount of refrigeration capacity can be provided at about the same temperature over a small chilling range to remove the latent heat of crystallization in much more efficient manner and to provide relatively large, pure ice crystal products. According to the present technique, pumping capacity required to circulate the coolant is substantially reduced and only that portion of coolant that is flashed and compressed and returned to the tower required the use of pumps for circulation. This results in substantial saving in initial invenment and service requirements to the process.

The apparatus and process of the present invention can be utilized to provide large refrigeration capacity for absorption of latent heat crystallization of a component which crystallizes from the solution over a narrow temperature range.

Through the invention has been described specifically to obtain fresh water from salt water, this technique can be utilized to remove any solvent component from a solution in which it is contained. Obviously, this novel, improved apparatus or process can also be utilized to carry out the separations described in application Ser. No. 163,214 and application Ser. No. 163,215 assigned to applicant's common assignee. The invention is only to be limited by the scope of the appended claim.

What is claimed is:

1. A process for crystallizing at least one component from a feed solution which comprises introducing the feed as a relatively dense dispersion of essentially uniform size droplets into a central cooling tower and contacting the dispersed droplets with a continuous phase immiscible liquid coolant following throughout the extent of the tower, introducing the coolant through spaced inlet openings along the vertical extent of the tower thus reducing the temperature of the feed, which openings are alternately spaced with respect to outlet openings along the height of the tower, and continuously removing warm coolant from the tower from the outlet openings adacent to the respective inlet openings, whereby the droplets are cooled and at least one component crystallized from the solution, separating the crystals from the mother liquor and recovering the separated crystals and mother liquor.

2. The process of claim 1 wherein the inlet openings are in communication with an outwardly-spaced concentric downflow convection chamber and the adacent outlet opening is in communication with an outwardly-spaced paired upflow convection chamber, said cold coolant continuously moving downwardly in said downflow chamber through said inlet opening into said tower cooling said feed droplets, said warm coolant moving continuously through said outlet opening into said upflow chamber establishing a convection flow of cold coolant into said tower and warm coolant out of said tower, said warm coolant moving into a top area of said convection chamber, flashing at least a portion of said coolant, cooling the remaining coolant and circulating the cooled coolant through the downflow convection chamber and through said coolant inlet opening back into said tower.

3. A process for crystallizing a solvent from a solution and concentrating the remaining solution which comprises introducing the feed solution as a relatively dense dispersion of essentially uniform size droplets into a central cooling tower and contacting the dispersed droplets with a continuous phase liquid coolant flowing throughout the extent of the tower, introducing the coolant through spaced inlet openings along the vertical extent of the tower, thus reducing the temperature of the feed by continuously introducing cold coolant into the tower through at least one of said inlet opening along the height of the tower and continuously removing warm coolant from the tower from at least one outlet opening adjacent to the inlet opening, the coolant flowing into and out of the tower by paired inlet and outlet openings setting up an essential convection flow of the coolant into and out of the tower whereby the droplets are cooled and at least a portion of the solvent crystallized from the feed solution and the solution concentrated, separating the crystals from the concentrated solution and recovering the separated crystals and concentrated solution.

4. The process of claim 3 wherein the entire circulation of coolant and the refrigeration required to crystallize a portion of the solvent are provided by internal coolant convection circulation means.

5. The process of claim 3 wherein the solvent crystallizes from solution over a narrow crystallization temperature range.

6. A process for crystallizing water from an aqueous feed solution and concentrating the remaining solution which comprises introducing the aqueous solution as a relatively dense dispersion of essentially uniform size droplets into one end of a central cooling tower and contacting the dispersed droplets with a continuous phase liquid coolant flowing throughout the extent of the tower, introducing the coolant through spaced inlet openings along the vertical extent of the tower thus reducing the temperature of the feed to the crystallization temperature of the water in the solution by continuously introducing cold coolant into the tower at said inlet openings, which openings are alternately spaced with respect to outlet openings along the height of the tower and continuously removing warm coolant from the tower from the outlet openings adjacent to the respective inlet openings, cooling the feed droplets and crystallizing at least a portion of the water in the droplets to form ice, collecting the ice crystals and concentrated solution at one end of the tower, separating the ice crystals from the concentrated solution and recovering separated ice crystals and concentrated solution.

7. A process for crystallizing water from an aqueous feed solution and concentrating the remaining solution which comprises introducing the aqueous solution as a relatively dense dispersion of essentially uniform size droplets into one end of a central cooling tower and contacting the dispersed droplets with a continuous phase normally gaseous immiscible liquid coolant flowing throughout the extent of the tower, reducing the temperature of the feed to the crystallization temperature of the water in the solution by continuously introducing coolant into the tower at spaced inlet openings from outwardly- and alternately-spaced concentric convection chambers, in which chambers the cold coolant flows downwardly into the tower through coolant inlet openings, which openings are alternately spaced with respect to outlet openings along the height of the tower, which communicate between the tower and the outwardly-spaced chambers, and continuously withdrawing warm coolant from the tower into outwardly- and alternately-spaced concentric convection chambers, in which chambers the warm coolant flows upwardly, said upflow chambers communicating with said tower by means of outlet openings along the height of the tower adacent to said inlet openings, collecting the warm coolant in a top region of the convection chambers, flashing at least a portion of the coolant, cooling the remaining coolant, circulating the cold coolant into the downflow convection chambers back into the tower through the coolant inlet openings, cooling the feed droplets and crystallizing at least a portion of the water in the droplets to form ice, collecting the ice crystals and concentrated solution at one end of the tower, separating the ice crystals from concentrated solution and recovering separated ice crystals and concentrated solution, removing the vaporized coolant from the top of the tower, compressing, cooling and liquefying the coolant and returning the coolant to the tower through a downflow convection chamber.

8. The process of claim 7 wherein a portion of the coolant is returned to an upflow concentric convection chamber as a vapor.

9. The process of claim 7 wherein the feed is more dense than the coolant and is introduced into the top of the tower and the ice crystals and concentrated solution removed from the bottom of the tower.

10. The process of claim 7 wherein the feed is less dense than the coolant and is introduced into the bottom of the tower and the ice crystals and concentrated solution removed from the top of the tower.

11. The process of claim 7 wherein adjacent downflow and upflow convection chambers and adjacent coolant inlet openings and coolant outlet openings form a pair in which convection flow is established between the tower and the outwardly-spaced paired concentric convection chambers.

12. The process of claim 7 wherein the feed is introduced in the tower into a quiescent area of a continuous coolant phase.

13. The process of claim 7 wherein the feed is introduced at a temperature of 28 to 35° F.; the coolant is butane and is introduced into the tower at a temperature of 24 to 26° F., from 5 to 20% by volume of the coolant is flashed to a temperature of 20 to 26° F. in the flash chamber and ice crystals substantially free of dissolved salts are recovered.

References Cited

UNITED STATES PATENTS

| | | | |
|---|---|---|---|
| 2,663,162 | 12/1953 | Trepaud | 62—347 |
| 2,886,603 | 5/1959 | Shelton | 62—58 |
| 3,098,735 | 7/1963 | Clark | 62—58 |
| 3,150,499 | 9/1964 | Margiloff | 62—58 |
| 3,178,899 | 4/1965 | Torobin et al. | 62—58 |

NORMAN YUDKOFF, *Primary Examiner.*

G. P. HINES, *Assistant Examiner.*